United States Patent
Hwang et al.

(10) Patent No.: US 9,853,720 B2
(45) Date of Patent: Dec. 26, 2017

(54) METHOD AND USER EQUIPMENT FOR SIMULTANEOUSLY ACCESSING PLURALITY OF CELLS

(71) Applicant: LG ELECTRONICS INC., Seoul (KR)

(72) Inventors: Daesung Hwang, Seoul (KR); Dongyoun Seo, Seoul (KR); Yunjung Yi, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 14/911,716

(22) PCT Filed: Jul. 15, 2014

(86) PCT No.: PCT/KR2014/006365
§ 371 (c)(1),
(2) Date: Feb. 11, 2016

(87) PCT Pub. No.: WO2015/026060
PCT Pub. Date: Feb. 26, 2015

(65) Prior Publication Data
US 2016/0197671 A1 Jul. 7, 2016

Related U.S. Application Data

(60) Provisional application No. 61/867,618, filed on Aug. 20, 2013, provisional application No. 61/874,359, filed on Sep. 6, 2013.

(51) Int. Cl.
*H04W 4/00* (2009.01)
*H04B 7/26* (2006.01)
(Continued)

(52) U.S. Cl.
CPC .......... *H04B 7/2615* (2013.01); *H04L 5/001* (2013.01); *H04W 72/044* (2013.01);
(Continued)

(58) Field of Classification Search
CPC ..... H04B 7/2615; H04L 5/001; H04L 5/0007; H04L 5/0051; H04W 72/044; H04W 76/025
See application file for complete search history.

(56) References Cited

U.S. PATENT DOCUMENTS 9,642,140 B2* 5/2017 Ng ............... H04W 72/0453
9,680,628 B2* 6/2017 Choi ................... H04L 5/14
(Continued)

OTHER PUBLICATIONS

CMCC, "Consideration on General FDD/TDD Joint Operation for LTE", RP-130696, 3GPP TSG-RAN #60, Oranjestad, Aruba, Jun. 11-14, 2013, 4 pages.
(Continued)

*Primary Examiner* — Kevin Mew
(74) *Attorney, Agent, or Firm* — Lee, Hong, Degerman, Kang & Waimey

(57) ABSTRACT

The present specification provides a method by which a user equipment (UE) simultaneously accesses a plurality of cells. The simultaneously access method can comprise the steps of: setting connections with a first cell of a frequency division duplex (FDD) scheme and a second cell of a time division duplex (TDD) scheme; and transmitting and receiving a control signal and data to and from the first cell of the FDD scheme and the second cell of the TDD scheme. Here, an uplink subframe and a downlink subframe for the first cell of the FDD scheme can be temporally divided according to the TDD scheme and provided to the UE.

12 Claims, 16 Drawing Sheets

(51) Int. Cl.
*H04W 76/02* (2009.01)
*H04W 72/04* (2009.01)
*H04L 5/00* (2006.01)

(52) U.S. Cl.
CPC ......... *H04W 76/025* (2013.01); *H04L 5/0007* (2013.01); *H04L 5/0051* (2013.01)

(56) References Cited

U.S. PATENT DOCUMENTS

| | | | | |
|---|---|---|---|---|
| 9,706,568 | B2* | 7/2017 | Ekpenyong | H04W 72/14 |
| 2006/0077931 | A1* | 4/2006 | Lee | H04B 7/2615 |
| | | | | 370/329 |
| 2006/0126546 | A1* | 6/2006 | Lee | H04B 7/2615 |
| | | | | 370/310 |
| 2009/0047914 | A1 | 2/2009 | Axness et al. | |
| 2011/0098074 | A1* | 4/2011 | Seo | H04L 5/0007 |
| | | | | 455/509 |
| 2012/0106404 | A1 | 5/2012 | Damnjanovic | |
| 2012/0314626 | A1 | 12/2012 | Alapuranen | |
| 2014/0029484 | A1* | 1/2014 | Choi | H04J 3/1694 |
| | | | | 370/280 |
| 2014/0092785 | A1* | 4/2014 | Song | H04L 1/00 |
| | | | | 370/280 |
| 2014/0177488 | A1* | 6/2014 | Yang | H04B 7/2643 |
| | | | | 370/280 |
| 2014/0293893 | A1* | 10/2014 | Papasakellariou | H04W 72/04 |
| | | | | 370/329 |
| 2015/0023228 | A1* | 1/2015 | Yin | H04L 5/001 |
| | | | | 370/280 |
| 2015/0055521 | A1* | 2/2015 | Seo | H04L 5/001 |
| | | | | 370/280 |
| 2015/0117275 | A1* | 4/2015 | Park | H04L 1/1812 |
| | | | | 370/280 |
| 2015/0304074 | A1* | 10/2015 | Seo | H04W 74/002 |
| | | | | 370/329 |
| 2015/0304087 | A1* | 10/2015 | He | H04W 72/12 |
| | | | | 370/280 |
| 2016/0021593 | A1* | 1/2016 | Chou | H04W 76/00 |
| | | | | 370/280 |
| 2016/0112178 | A1* | 4/2016 | Yi | H04W 16/32 |
| | | | | 370/280 |
| 2016/0226631 | A1* | 8/2016 | Seo | H04L 1/1854 |
| 2016/0242151 | A1* | 8/2016 | Seo | H04W 72/1289 |
| 2016/0254899 | A1* | 9/2016 | Hwang | H04L 5/0055 |
| | | | | 370/280 |

OTHER PUBLICATIONS

Nokia Corporation, "New WI: LTE TDD-FDD Joint Operation—Core Part", RP-130888, 3GPP TSG-RAN meeting #60, Oranjestad, Aruba, Jun. 11-14, 2013, 9 pages.

PCT International Application No. PCT/KR2014/006365, International Search Report dated Oct. 13, 2014, 2 pages.

\* cited by examiner (b) MULTIPLE CCS (a) SINGLE CC

METHOD AND USER EQUIPMENT FOR SIMULTANEOUSLY ACCESSING PLURALITY OF CELLS

CROSS-REFERENCE TO RELATED APPLICATIONS

This application is the National Stage filing under 35 U.S.C. 371 of International Application No. PCT/KR2014/006365, filed on Jul. 15, 2014, which claims the benefit of U.S. Provisional Application No. 61/867,618, filed on Aug. 20, 2013, and 61/874,359, filed on Sep. 6, 2013, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, a user demands a higher transfer rate, and to cope with this demand, there is a need to allow a user equipment (UE) to be capable of simultaneously accessing both of a cell based on FDD and a cell based on TDD. If a certain mobile communication operator provides only an FDD-based service or a TDD-based service similarly to the conventional method at a time when the higher transfer rate is required, it may be ineffective in terms of a frequency usage.

SUMMARY OF THE INVENTION

Accordingly, the disclosure of the specification has been made in an effort to solve the problem.

In order to achieve the aforementioned purpose, disclosures of the present specification propose a method for allowing a user equipment (UE) to be capable of performing transmission/reception by simultaneously accessing both of a cell based on frequency division duplex (FDD) and a cell based on time division duplex (TDD).

Specifically, in order to achieve the aforementioned purpose, the present specification provides a method by which a user equipment (UE) simultaneously accesses a plurality of cells. The method may comprise: establishing a connection with a frequency division duplex (FDD)-based first cell and a time division duplex (TDD)-based second cell; and transmitting and receiving a control signal and data with respect to the FDD-based first cell and the TDD-based second cell. Here, an uplink (UL) subframe and downlink (DL) subframe of the FDD-based first cell is provided to the UE in a time division manner on the basis of TDD.

The UL subframe and DL subframe provided to the UE from the FDD-based first cell may be determined on the basis of a TDD UL-DL configuration of the TDD-based second cell.

The UL subframe and DL subframe of the FDD-based first cell may have the same arrangement as an arrangement of a subframe based on the TDD UL-DL configuration of the TDD-based second cell.

The UL subframe and DL subframe of the FDD-based first cell may have an arrangement opposite to an arrangement of a subframe based on the TDD-based second TDD UL-DL configuration.

The UL subframe or the DL subframe may be located by the FDD-based first cell on a position of a specific subframe based on the TDD-based second cell.

The method may further comprise: transmitting a physical random access channel (PRACH) according to a configuration of a cell corresponding to a primary cell of a carrier aggregation (CA) between the FDD-based first cell and the TDD-based second cell.

The method may further comprise: receiving a TDD-based PRACH configuration for the FDD-based first cell.

On the other hand, in order to achieve the aforementioned purpose, the present specification provides a user equipment (UE) capable of simultaneously accessing a plurality of cells. The UE may comprise: a transceiver; and a processor configured to establish a connection with a frequency division duplex (FDD)-based first cell and a time division duplex (TDD)-based second cell and thereafter for transmitting/receiving a control signal and data. Here, an uplink (UL) subframe and downlink (DL) subframe of the FDD-based first cell is provided to the UE in a time division manner on the basis of TDD.

According to a disclosure of the present specification, the aforementioned problem of the conventional technique can be solved.

DESCRIPTION OF EXEMPLARY EMBODIMENTS

Figure 1:
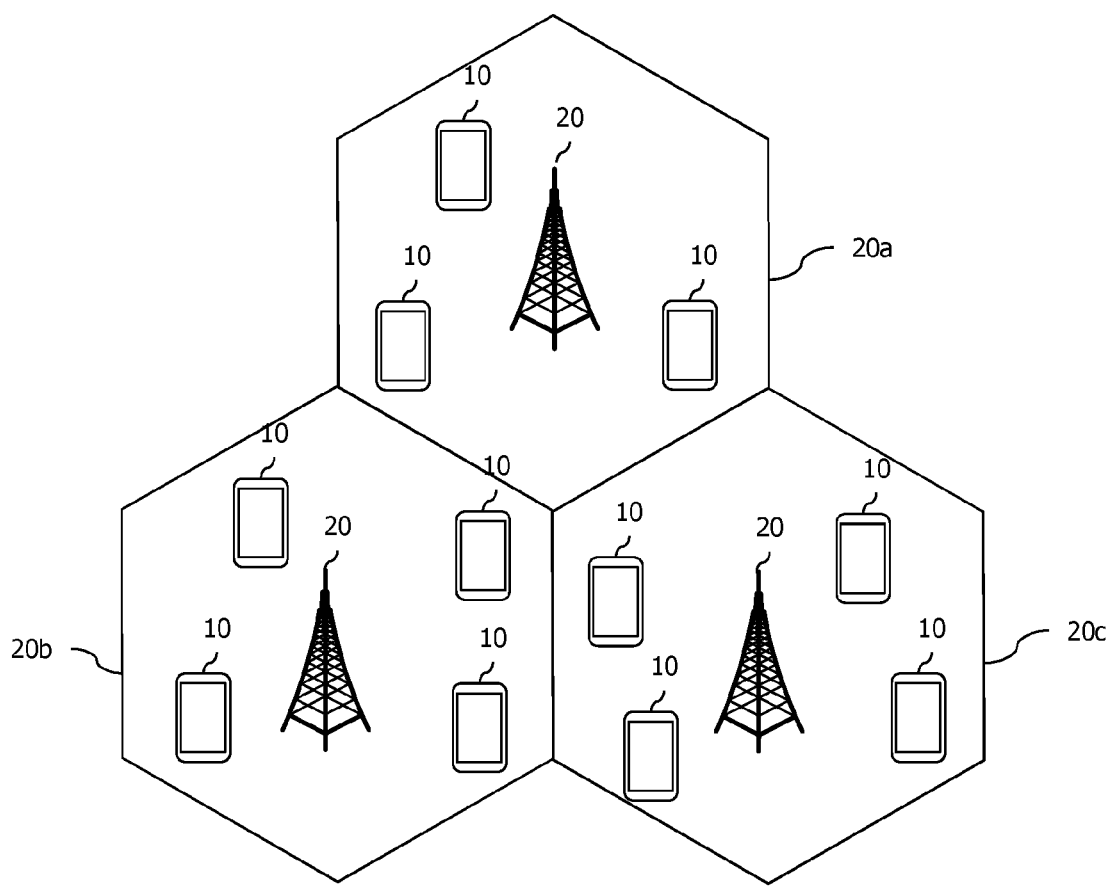
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response.

In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
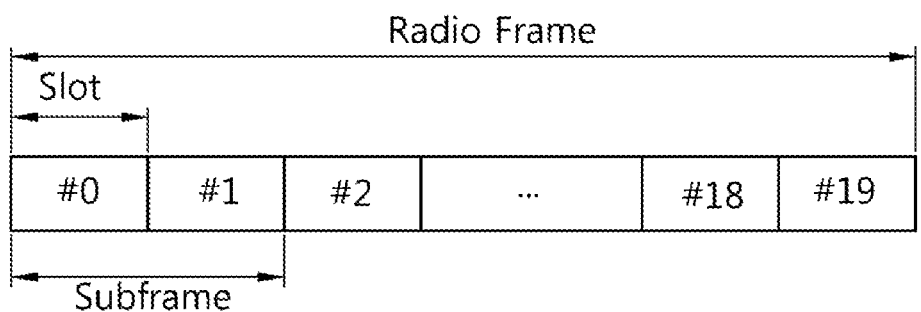
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
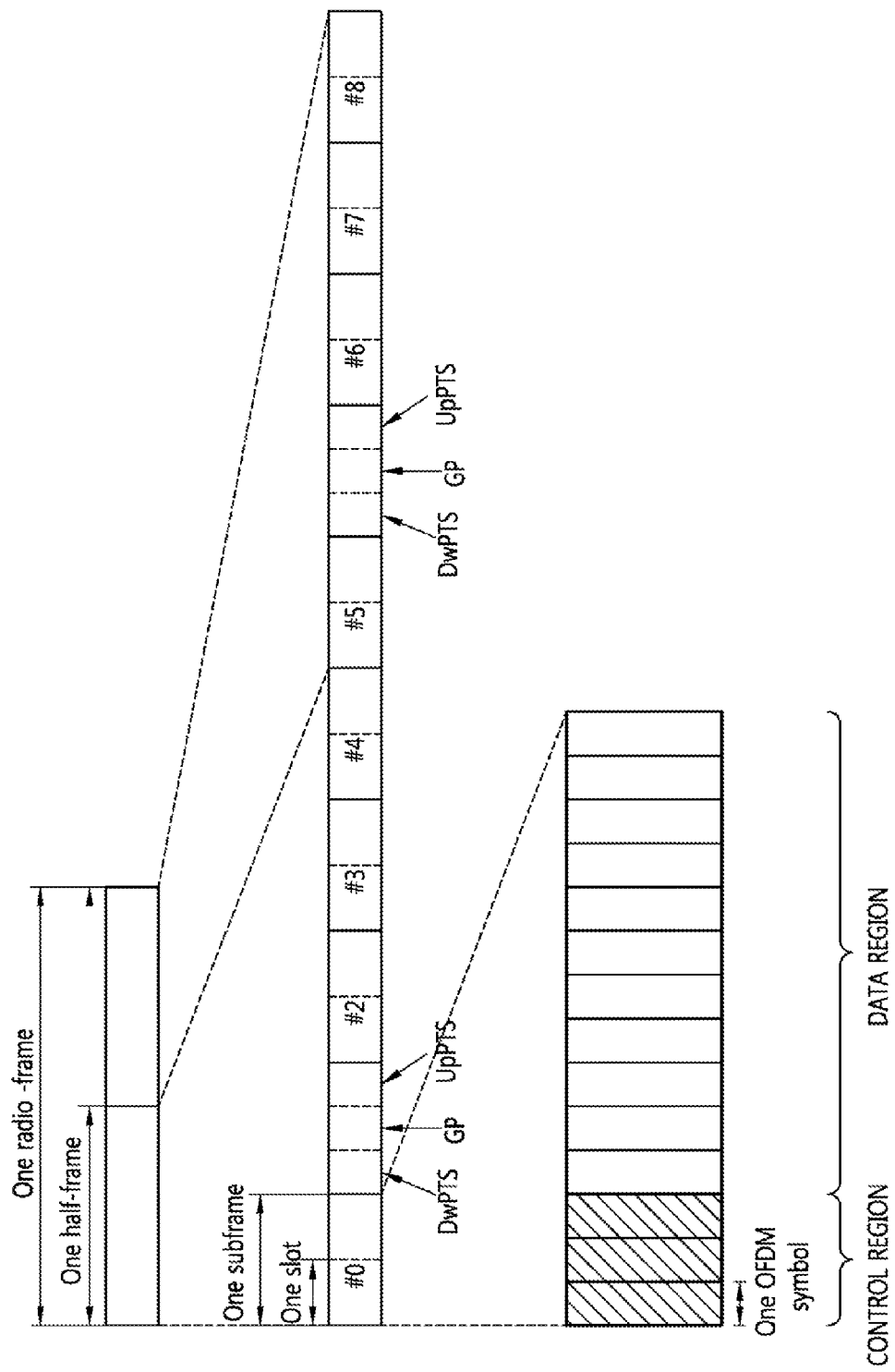
FIG. 3 illustrates the architecture of a downlink radio frame according to time division duplex (TDD) in 3GPP LTE.

FIG. 3 shows an example of a resource grid for one uplink or downlink slot in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Config-uraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame.

When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
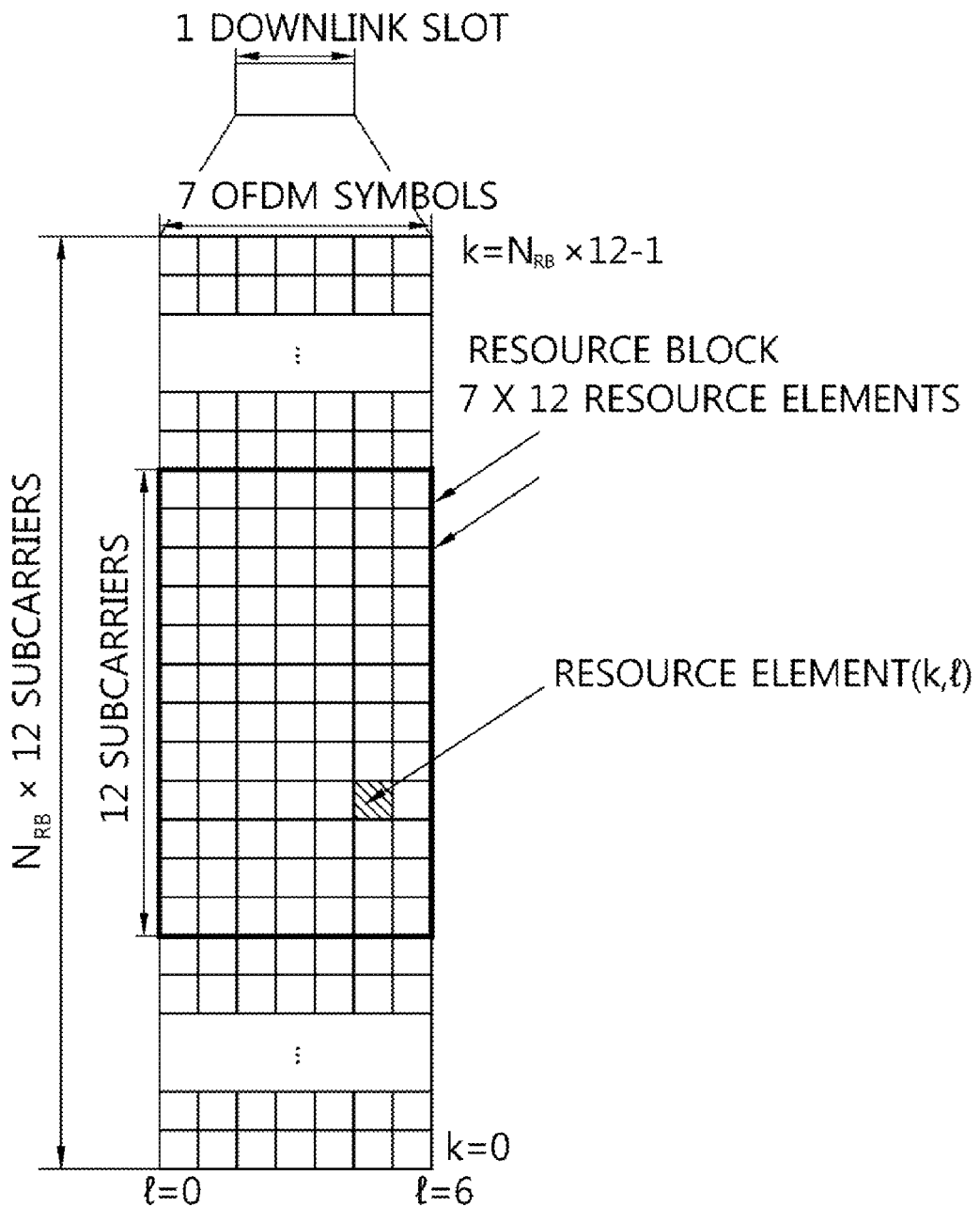
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and $N_{RB}$ resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., $N_{UL}$, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
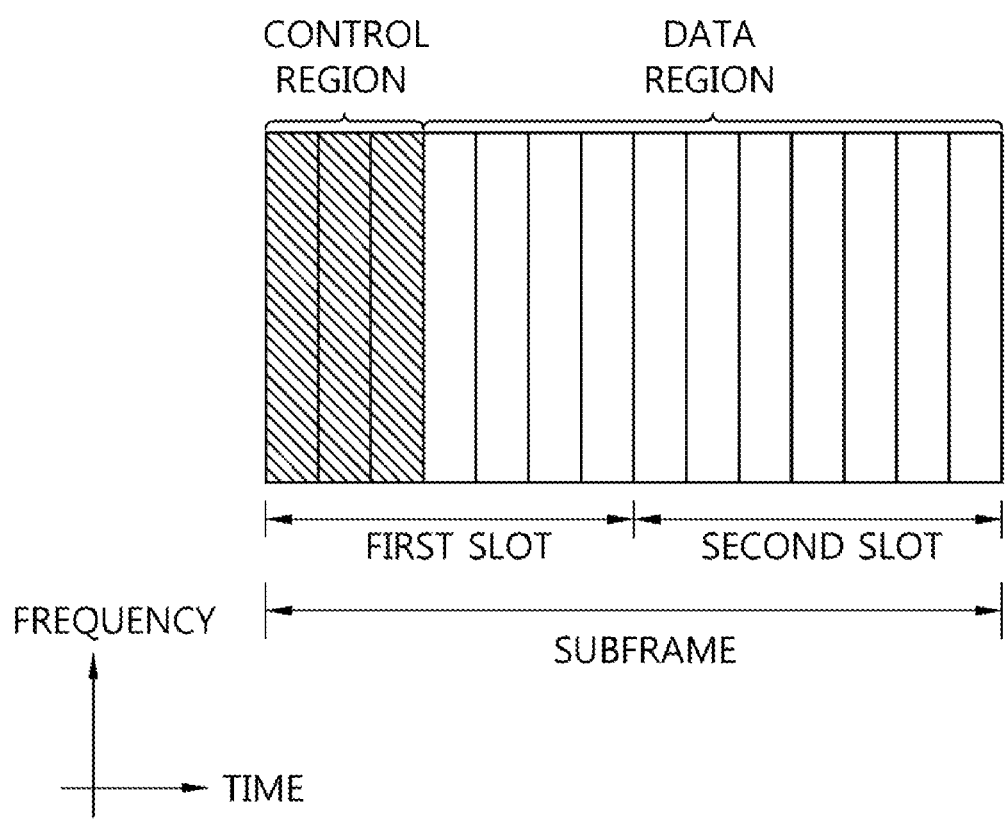
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/ NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

A usage of the DCI format is classified as shown in the following table.

TABLE 3

| DCI format | Contents |
|---|---|
| DCI format 0 | Used for PUSCH scheduling |
| DCI format 1 | Used for scheduling one PDSCH codeword |
| DCI format 1A | Used for compact scheduling of one PDSCH codeword and random access procedure |
| DCI format 1B | Used for compact scheduling of one PDSCH codeword including precoding information |
| DCI format 1C | Used for very compact scheduling of one PDSCH codeword |
| DCI format 1D | Used for precoding and compact scheduling of one PDSCH codeword including power offset information |
| DCI format 2 | Used for PDSCH scheduling UEs setup as closed-loop spatial multiplexing |
| DCI format 2A | Used for PDSCH scheduling UEs setup as open-loop spatial multiplexing |
| DCI format 3 | Used for transmitting PUCCH having 2 bit power adjustments and TPC command of PUSCH |
| DCI format 3A | Used for transmitting PUCCH having 1 bit power adjustments and TPC command of PUSCH |

The uplink channels include a PUSCH, a PUCCH, an SRS (Sounding Reference Signal), and a PRACH (physical random access channel).

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 6:
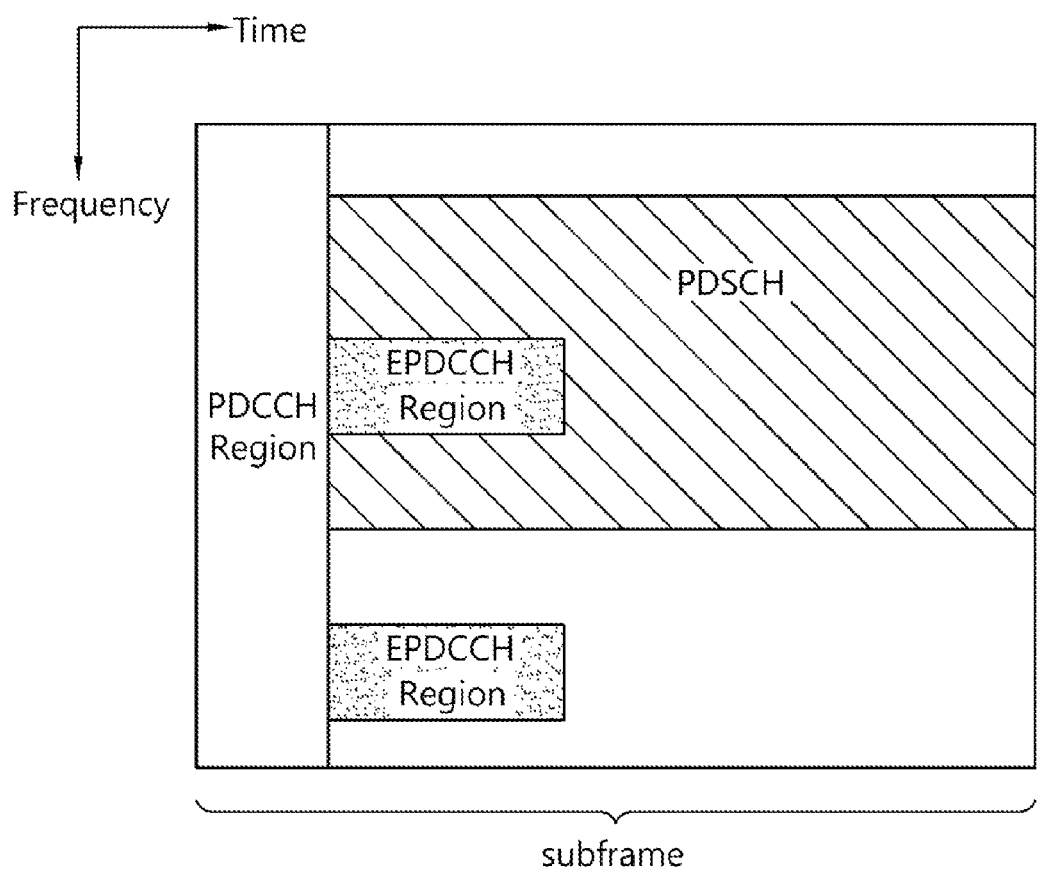
FIG. 6 illustrates a subframe having an EPDCCH.

FIG. 6 illustrates a subframe having an EPDCCH.

A subframe may include a zero or one PDCCH region or zero or more EPDCCH regions.

TABLE 2

| Transmission mode | DCI format | Search space | Transmission mode of PDSCH according to PDCCH |
|---|---|---|---|
| Mode 1 | DCI format 1A | Common and UE-specific | Single antenna port, port 0 |
|  | DCI format 1 | UE-specific | Single antenna port, port 0 |
| Mode 2 | DCI format 1A | Common and UE-specific | Transmission diversity |
|  | DCI format 1 | UE-specific | Transmission diversity |
| Mode 3 | DCI format 1A | Common and UE-specific | Transmission diversity |
|  | DCI format 2A | UE-specific | CDD (Cyclic Delay Diversity) or Transmission diversity |
| Mode 4 | DCI format 1A | Common and UE-specific | Transmission diversity |
|  | DCI format 2 | UE-specific | Closed-loop spatial multiplexing |
| Mode 5 | DCI format 1A | Common and UE-specific | Transmission diversity |
|  | DCI format 1D | UE-specific | MU-MIMO (Multi-user Multiple Input Multiple Output) |
| Mode 6 | DCI format 1A | Common and UE-specific | Transmission diversity |
|  | DCI format 1B | UE-specific | Closed-loop spatial multiplexing |
| Mode 7 | DCI format 1A | Common and UE-specific | Single antenna port, port 0 if the number of PBCH transmission port is 1, otherwise Transmission diversity |
|  | DCI format 1 | UE-specific | Single antenna port, port 5 |
| Mode 8 | DCI format 1A | Common and UE-specific | Single antenna port, port 0 if the number of PBCH transmission port is 1, otherwise Transmission diversity |
|  | DCI format 2B | UE-specific | Dual layer transmission (port 7 or 8), or single antenna port, port 7 or 8 |

The EPDCCH regions are regions in which a wireless device monitors an EPDCCH. The PDCCH region is located in up to four front OFDM symbols of a subframe, while the EPDCCH regions may flexibly be scheduled in OFDM symbols after the PDCCH region.

One or more EPDCCH regions may be designated for the wireless device, and the wireless devices may monitor an EPDCCH in the designated EPDCCH regions.

The number/location/size of the EPDCCH regions and/or information on a subframe for monitoring an EPDCCH may be provided by a base station to a wireless device through an RRC message or the like.

In the PDCCH region, a PDCCH may be demodulated based on a CRS. In the EPDCCH regions, a demodulation (DM) RS may be defined, instead of a CRS, for demodulation of an EPDCCH. An associated DM RS may be transmitted in the corresponding EPDCCH regions.

The respective EPDCCH regions may be used for scheduling of different cells. For example, an EPDCCH in the EPDCCH region may carry scheduling information for a primary cell, and an EPDCCH in the EPDCCH region may carry scheduling information for a secondary cell.

When an EPDCCH is transmitted through multiple antennas in the EPDCCH regions, the same precoding as that for the EPDCCH may be applied to a DM RS in the EPDCCH regions.

A PDCCH uses a CCE as a transmission resource unit, and a transmission resource unit for an EPDCCH is referred to as an enhanced control channel element (ECCE). An aggregation level may be defined as a resource unit for monitoring an EPDCCH. For example, when 1 ECCE is a minimum resource for an EPDCCH, an aggregation level may be defined as L={1, 2, 4, 8, 16}.

As illustrated, the EPDCCH is transmitted in the existing PDSCH region, and can acquire a beamforming gain and spatial diversity gain according to a transmission type. Further, since the EPDCCH transmits control information, higher reliability is required in comparison to data transmission, and to satisfy this, the concept of an aggregation level or the like is used to decrease a coding rate. The high aggregation level can decrease the coding rate, and thus can increase a demodulation accuracy, but has a disadvantage in that performance is decreased due to an increase in resources in use.

Figure 7:
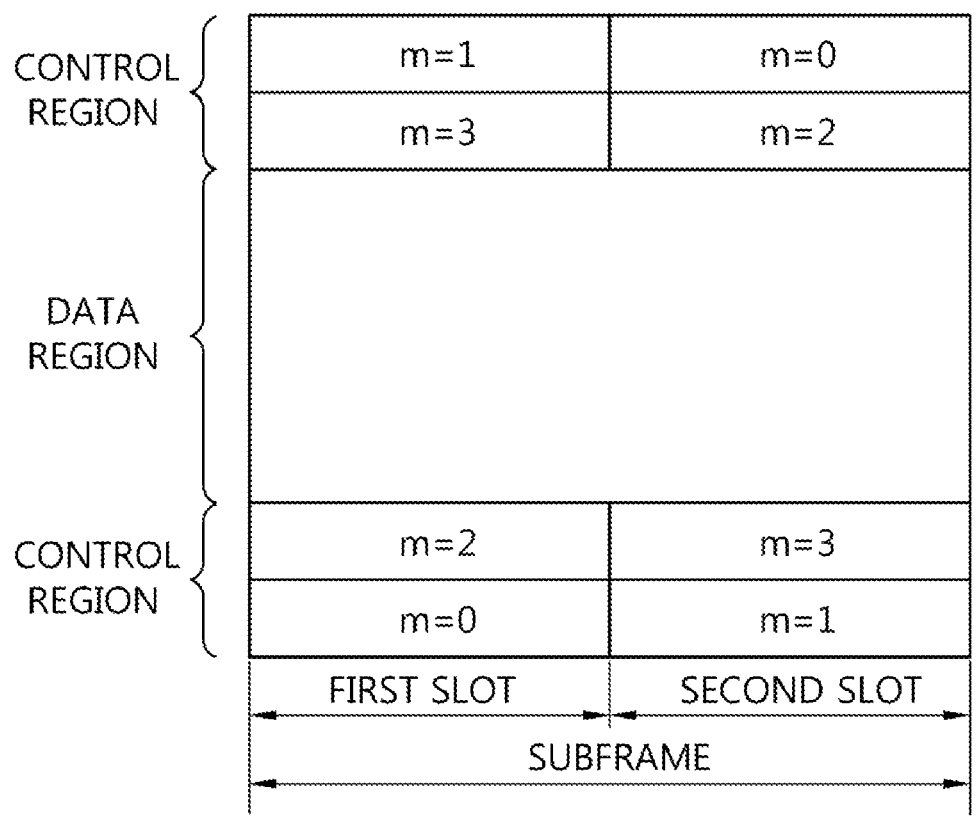
FIG. 7 illustrates the architecture of an uplink subframe in 3GPP LTE.

FIG. 7 illustrates the architecture of an uplink sub-frame in 3GPP LTE.

Referring to FIG. 7, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 8:
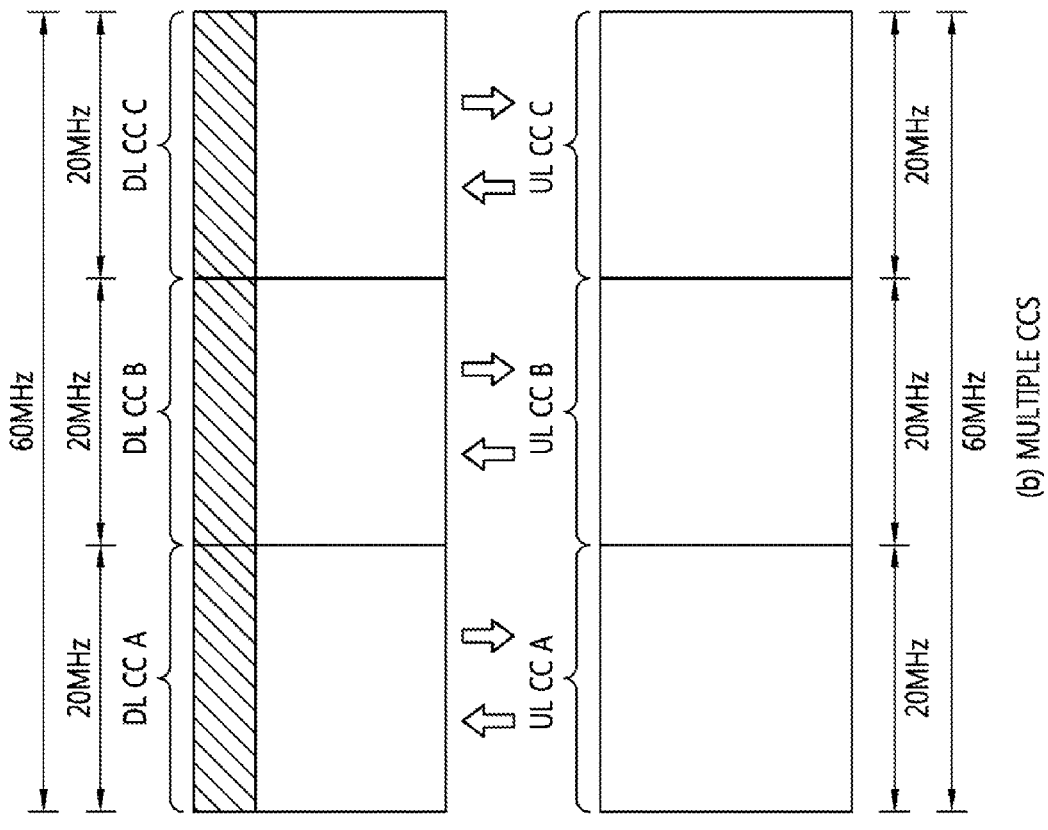
FIG. 8 illustrates an example of comparison between a single carrier system and a carrier aggregation system.
Figure 8:
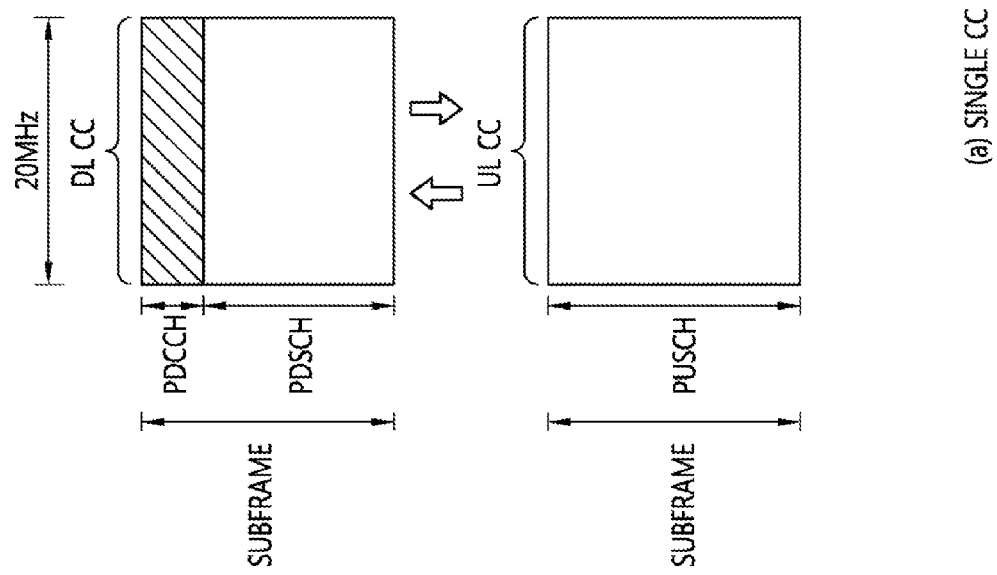

FIG. 8 illustrates an example of comparison between a single carrier system and a carrier aggregation system.

Referring to FIG. 8, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 9:
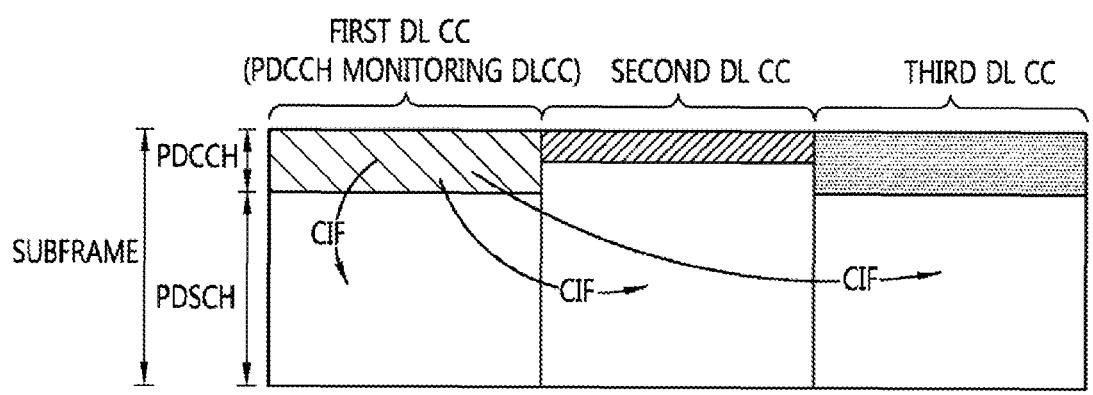
FIG. 9 exemplifies cross-carrier scheduling in a carrier aggregation system.

FIG. 9 exemplifies cross-carrier scheduling in the carrier aggregation system.

Referring to FIG. 9, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 9 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Meanwhile, in a next-generation mobile communication system, it is expected that a small cell of which a cell coverage radius is small is added in the coverage of the existing cell and that the small cell handles a greater amount of traffic. The existing cell has a greater coverage than that of the small cell, and thus is also referred to as a macro cell. Hereinafter, it is described with reference to FIG. 10.

Figure 10:
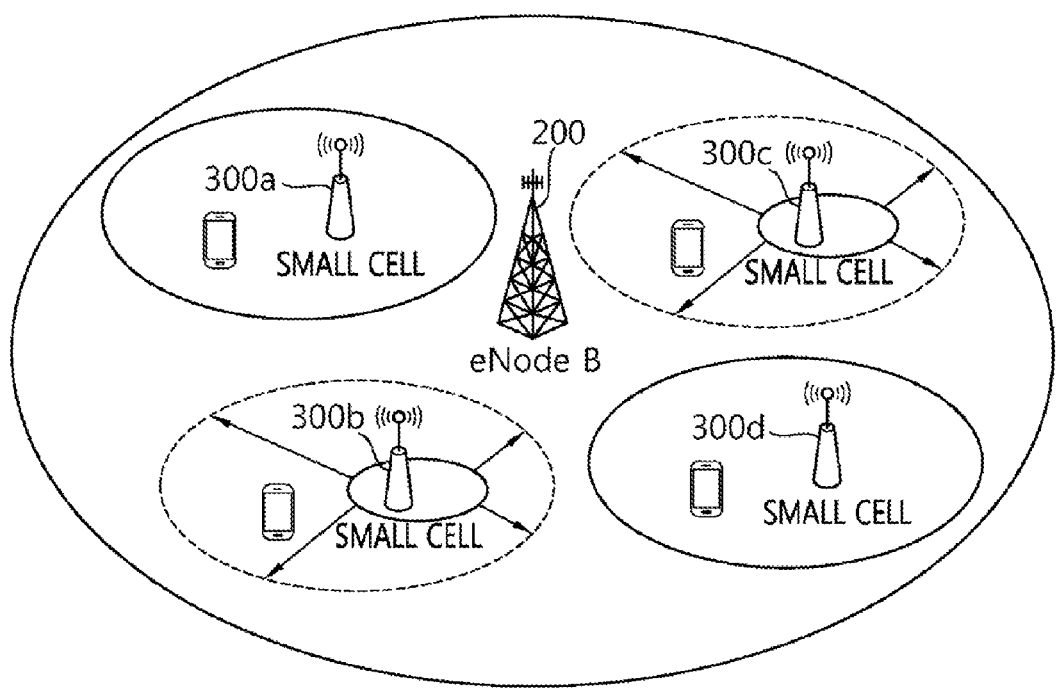
FIG. 10 shows a heterogeneous network environment in which a macro cell and a small cell co-exist and which is possibly used in a next-generation wireless communication system.

FIG. 10 shows a heterogeneous network environment in which a macro cell and a small cell co-exist and which is possibly used in a next-generation wireless communication system.

Referring to FIG. 10, it is shown a heterogeneous network environment in which a macro cell 200 overlaps with one or more small cells 300*a*, 300*b*, 300*c*, and 300*d*. A service of the macro cell 200 is provided by a macro eNodeB (MeNB). In the present specification, the macro cell and the MeNB may be used together. A UE having access to the macro cell 200 may be referred to as a macro UE. The macro UE receives a downlink signal from the MeNB, and transmits an uplink signal to the MeNB.

In such a heterogeneous network, coverage holes of the macro cell can be filled by configuring the macro cell as a primary cell (Pcell) and by configuring the small cell as a secondary cell (Scell). In addition, overall performance can be boosted by configuring the small cell as the Pcell and by configuring the macro cell as the Scell.

Meanwhile, the small cell may use a frequency band currently assigned to LTE/LTE-A, or may use a higher frequency band (e.g., a band greater than or equal to 3.5 GHz).

On the other hand, in a next LTE-A system, it is considered that the small cell is used only as a macro-assisted small cell which cannot be used independently and can be used under an assistance of the macro cell.

The small cells 300*a*, 300*b*, 300*c*, and 300*d* may have similar channel environments, and are located close to each other. Therefore, interference between the small cells is not a big problem.

The small cells 300*b* and 300*c* may extend or reduce their coverage to decrease an interference influence. Such coverage extension and reduction are called cell breathing. For example, as illustrated, the small cells 300b and 300c may be on or off according to a situation.

On the other hand, the small cell may use a frequency band currently assigned to LTE/LTE-A, or may use a higher frequency band (e.g., a band greater than or equal to 3.5 GHz).

Meanwhile, the UE may perform dual connectivity to the macro cell and the small cell. Possible dual connectivity scenarios are shown in FIG. 11a to FIG. 11b.

Figure 11A:
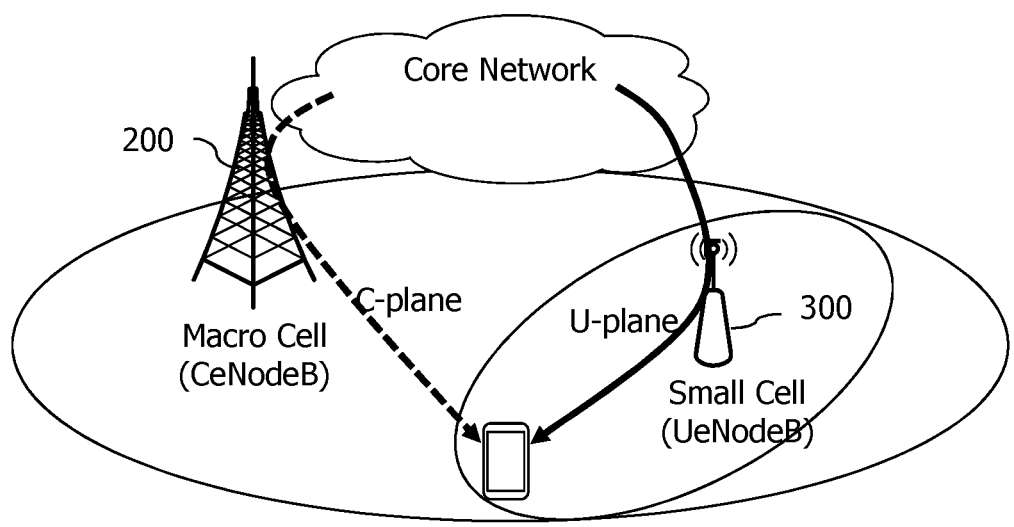
FIG. 11a and FIG. 11b show possible dual connectivity scenarios for a macro cell and a small cell.
Figure 11B:
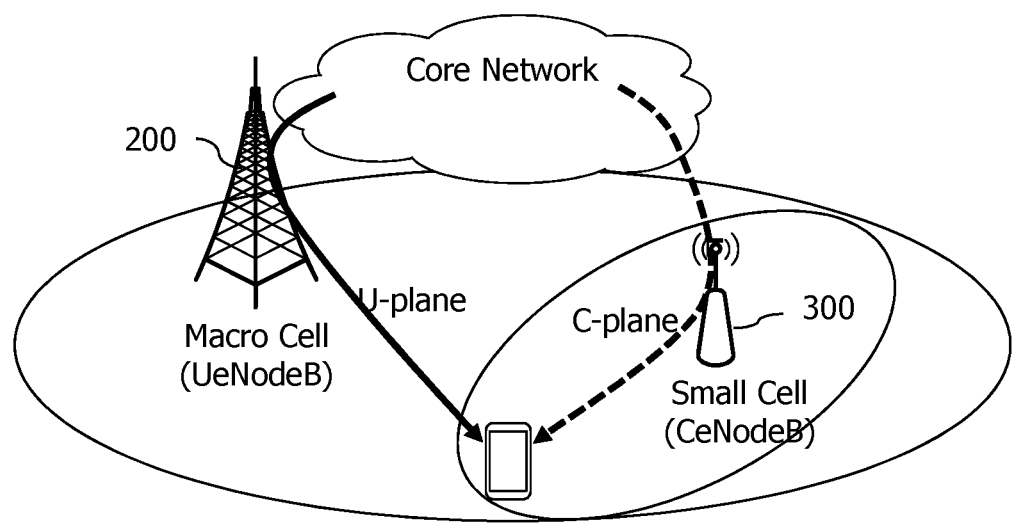

FIG. 11a and FIG. 11b show possible dual connectivity scenarios for a macro cell and a small cell.

As shown in FIG. 11a, a macro cell and a small cell may be assigned to a UE as a Control-plane (hereinafter, C-plane) and a User-plane (hereafter, U-plane), respectively.

Alternatively, as shown in FIG. 11b, a small cell and a macro cell may be assigned to a UE as a C-plane and a U-plane, respectively. In the present specification, for convenience, a cell of the C-plane and a cell of the U-plane are referred to as a C-cell and a U-cell, respectively.

The C-plane supports an RRC connection configuration and reconfiguration, an RRC idle mode, a mobility including handover, a cell selection/reselection, an HARQ process, a carrier aggregation (CA) configuration and reconfiguration, a necessary procedure for RRC configuration, a random access procedure, or the like. In addition, the U-plane supports data processing of an application, a CSI report, an HARQ process for application data, a multicasting/broadcasting service, or the like.

From a UE perspective, the C-plane and the U-plane are configured as follows. The C-cell may be configured as a primary cell, and the U-cell may be configured as a secondary cell. Alternatively, on the contrary, the U-cell may be configured as the primary cell, and the C-cell may be configured as the secondary cell. Alternatively, the C-cell may be separately handled in a special manner, and the U-cell may be configured as the primary cell. Alternatively, both of the C-plane and the U-cell may be configured as the primary cells. However, in the present specification, for convenience, it is assumed in the following description that the C-cell is configured as the primary cell and the U-cell is configured as the secondary cell.

Meanwhile, as described above, in case of a UE 100, one UE may have access to a plurality of cells. However, according to the existing LTE-A release 10, the plurality of cells must have the same frame structure type. In other words, according to the existing LTE-A release 10, all of the plurality of cells must use either FDD or TDD.

In recent years, a user demands a higher transfer rate, and to cope with this demand, there is a need to allow a UE to be capable of simultaneously accessing both of a cell using FDD and a cell using TDD. If a certain mobile communication operator provides only an FDD-based service or a TDD-based service similarly to the conventional method at a time at which the higher transfer rate is required, it may be ineffective in terms of a frequency usage.

<Brief Description on Disclosures of the Present Specification>

Accordingly, disclosures of the present specification propose a method for allowing a UE to be capable of performing transmission/reception by simultaneously accessing both of a cell based on FDD and a cell based on TDD. The UE may be allowed to be capable of accessing the plurality of cells through a carrier aggregation (CA) and a dual connectivity.

However, the UE must have a radio frequency (RF) unit and a modem with very high performance so that data is transmitted/received simultaneously with respect to both of the FDD cell and the TDD cell. In other words, in order to allow the UE to transmit UL data simultaneously to the FDD cell and the TDD cell on a first subframe, receive DL data simultaneously from the two cells on a second subframe, and transmit UL data to any one cell and receive DL data from the other cell on a third subframe, the UE must have the RF unit and the modem with very high performance. However, this may result in a cost increase beyond user's tolerable limits.

Accordingly, a method of solving the aforementioned problem is proposed as follows in the present specification.

<FDD Based on Time-Division Similar to TDD>

In order to solve the aforementioned problem, the present specification proposes a method of allowing a UE to transmit/receive data in an FDD cell in a TDD manner. This will be described in greater detail with reference to the accompanying drawings.

Figure 12A:
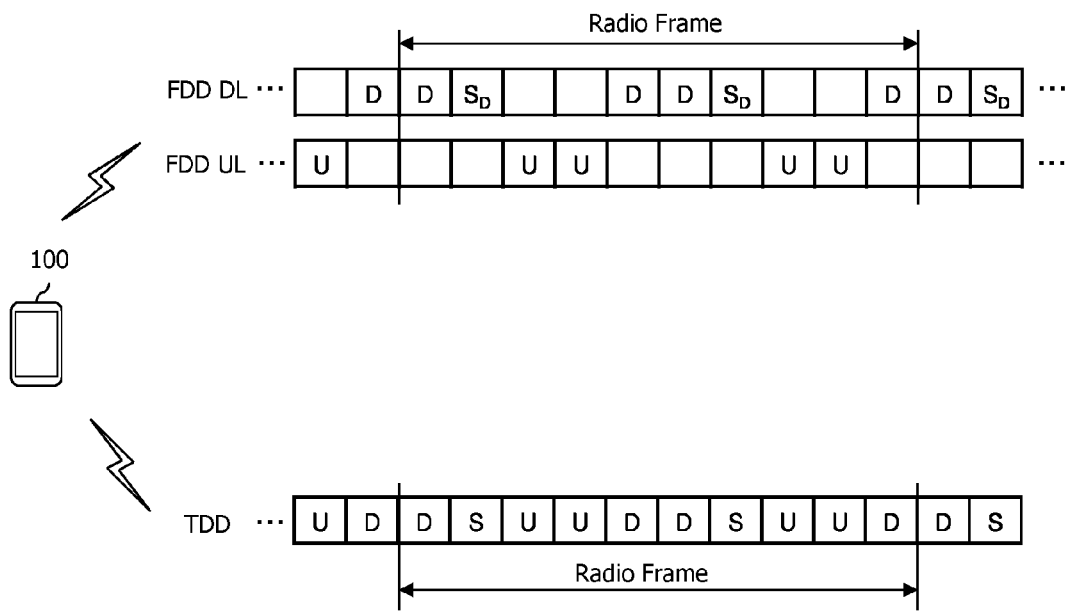
FIG. 12a and FIG. 12b show examples of a method according to a first embodiment.
Figure 12B:
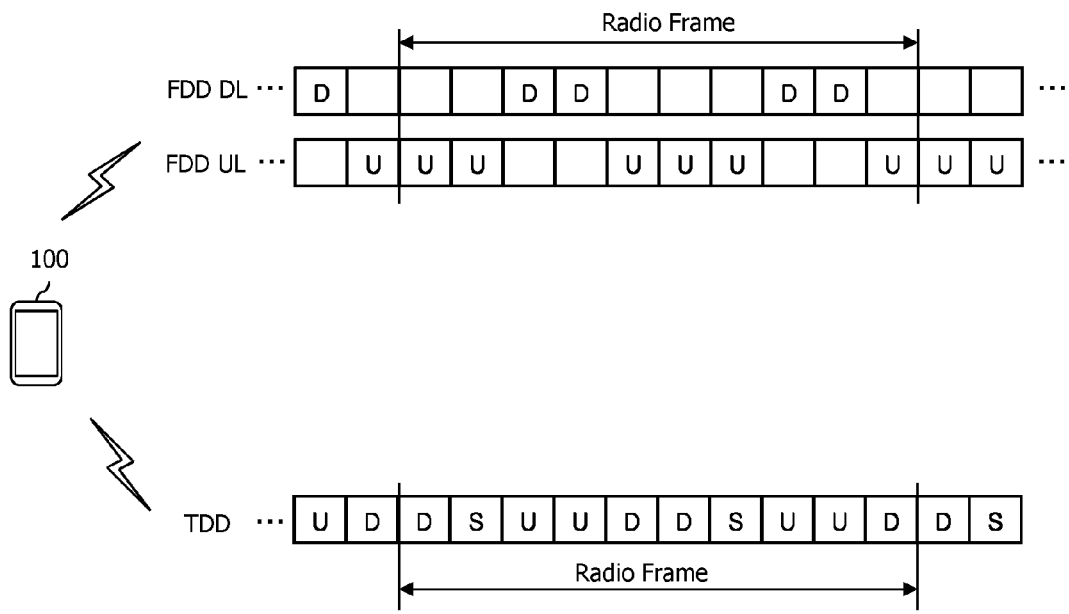

FIG. 12a and FIG. 12b show examples of a method according to a first embodiment.

As can be seen from FIG. 12a, similarly to TDD, a UE 100 may be allowed to transmit/receive data with respect to an FDD cell in a TDD manner. That is, it may be considered that the UE alternately transmit UL data and receive DL data in a time division manner also with respect to the FDD cell. This may be referred to as half-duplex FDD communication. In doing so, there is no need to provide an RF unit inside the UE for each FDD UL, FDD DL, and TDD UL/DL. Alternatively, the number of RF units may be minimized to two. If only two RF units are used, one RF unit may be used for UL/DL for a TDD cell, and the other one may be used only for UL/DL for the FDD cell. However, if the number of RF units is minimized to two as described above, there is a restriction in that the UE must not perform UL transmission and DL reception simultaneously with respect to the FDD cell at a specific time point. That is, at the specific time point, the UE may perform UL transmission with respect to the TDD cell and may perform DL reception with respect to the FDD cell.

More specifically, as shown in FIG. 12a, the FDD cell may arrange a UL subframe at the same position as a DL subframe of the TDD cell, and may arrange a DL subframe at the same position as a DL subframe of the TDD cell. As a more specific example, as shown in FIG. 12a, if a TDD cell to which the UE has access uses the TDD UL-DL configuration 1 of Table 1, the FDD cell may operate the DL subframe and the UL subframe similarly to the TDD cell to which the UE has access.

In this case, any one of the UL subframe and the DL subframe may be dynamically arranged at the same position as a special subframe of the TDD cell.

Meanwhile, when the UE 100 intends to alternately perform DL reception and UL reception, a guard interval may be necessary. In this case, the FDD cell may set the same guard interval as to a group of UEs which alternately perform reception and transmission with the same timing. Alternatively, the FDD cell may set the guard interval with reference to the TDD UL-DL configuration of Table 1. For example, the FDD cell may apply a special subframe as the guard interval according to the TDD UL-DL configuration of Table 1.

On the other hand, as shown in FIG. 12b, the FDD cell may operate the DL subframe and the UL subframe in an opposite manner of the TDD cell to which the UE has access. According to the FDD subframe arrangement of FIG. 12, in a situation where one RF unit of the UE 100 is used for the FDD cell and the other RF unit is used for the TDD cell, a chronic problem regarding a transmission timing of HARQ-ACK/NACK of TDD can be solved by allowing DL/UL transmission to be possible in every subframe. That is, in case of TDD, a conventional problem in which HARQ-ACK/NACK for DL data received in a subframe n cannot be transmitted in a subframe n+4 can be solved through the aforementioned FDD subframe arrangement.

On the other hand, the FDD cell may operate the DL subframe and the UL subframe according to a UL-DL configuration different from the TDD UL-DL configuration used in the TDD cell to which the UE has access.

The different UL-DL configuration may be selected on the basis of the UL-DL configuration of the TDD cell to which the UE has access or may be selected independently irrespective thereof. Further, the different UL-DL configuration may be selected to be different for each UE, or may be selected to be different for each group of UEs. The different UL-DL configuration selected in this manner may be delivered to the UE through a high layer signal. The high layer signal may be delivered from the TDD cell to the UE or may be delivered from the FDD cell to the UE. On the other hand, the UE may confirm a UL subframe of the FDD cell according to a UL-DL configuration indicated by the received high layer signal, and may transmit a PRACH on a UL subframe of the confirmed FDD cell.

The above descriptions may be applied not only to a half-duplex UE but also to a full-duplex UE. When the above descriptions are applied to the full-duplex UE, there is an advantage in that high complexity required in the determining of the HARQ-ACK timing in the existing TDD cell can be simplified. Meanwhile, when the above descriptions are applied to the full-duplex UE, the aforementioned guard interval may be omitted.

The above descriptions may be classified for each type and is summarized as follows.

Type 1: A carrier aggregation (CA) of a full duplex FDD cell and TDD cell with possibility of transmission/reception simultaneously in UL and DL.

Type 2: A CA of a full duplex FDD cell and TDD cell without possibility of transmission/reception simultaneously in UL and DL.

Type 3: A CA of a half duplex FDD cell and TDD cell with possibility of transmission/reception simultaneously in UL and DL.

Type 4: A CA of a half duplex FDD cell and TDD cell without possibility of transmission/reception simultaneously in UL and DL.

Type 5: A dual connectivity for a full duplex FDD cell and TDD cell with possibility of UL transmission simultaneously to the two cells.

Type 6: A dual connectivity for a full duplex FDD cell and TDD cell without possibility of UL transmission simultaneously to the two cells.

Type 7: A dual connectivity for a half duplex FDD cell and TDD cell with possibility of transmission/reception simultaneously in UL and DL.

Type 7: A dual connectivity for a half duplex FDD cell and TDD cell without possibility of transmission/reception simultaneously in UL and DL.

Type 7: A dual connectivity for a half duplex FDD cell and TDD cell without possibility of transmission/reception simultaneously in UL and DL.

Although the present specification focuses on the types 3, 4, 7, and 8 among the aforementioned types, it should be noted that the other types are not excluded.

On the other hand, a method of transmitting a PRACH will be described hereinafter when the UE has access simultaneously to the TDD cell and the FDD cell.

<PRACH Transmission>

When the UE 100 performs a carrier aggregation (CA) on an FDD cell and a TDD cell or is connected through a dual connectivity, if UL transmission can be performed on each of the two cells, a PRACH may be transmitted to each cell. Details thereof will be described with reference to FIG. 13.

Figure 13:
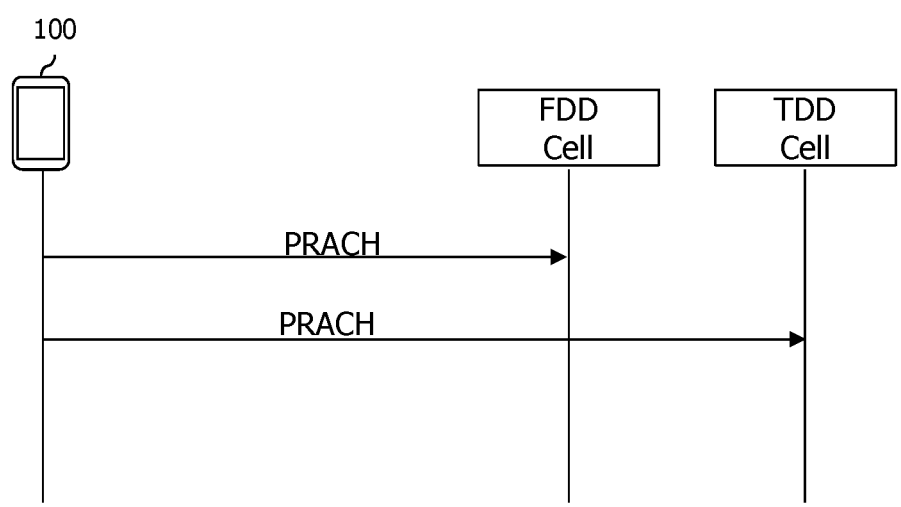
FIG. 13 shows an example of transmitting a physical random access channel (PRACH) to each of a TDD cell and an FDD cell.

FIG. 13 shows an example of transmitting a PRACH to each of a TDD cell and an FDD cell.

As can be seen from FIG. 13, when the UE 100 performs a carrier aggregation (CA) on an FDD cell and a TDD cell or is connected through a dual connectivity, and is capable of performing UL transmission to each of the two cells, according to a frame structure used in each cell, the UE 100 may use a PRACH configuration corresponding TDD in the TDD cell, and may use a PRACH configuration corresponding to FDD in the FDD cell. That is, this is to maintain compatibility with the existing LTE-A system to the maximum extent possible.

However, when the UE 100 can perform only one UL transmission, the PRACH configuration may be determined according to whether a cell corresponding to a primary cell (PCell) is accessible in a full-duplex manner or in a half-duplex manner. For example, if the PCell is the FDD cell, a PRACH may be transmitted according to the PRACH configuration of FDD. This method may also be applied to a case where the PRACH is transmitted to a secondary cell (SCell) according to a PDCCH order. Meanwhile, in a situation where the PCell of a carrier aggregation is the FDD cell and the SCell is the TDD cell, if a time at which the UE intends to perform PRACH transmission is not operated as a UL subframe by the TDD cell which is the SCell, the UE may transmit the PRACH to the FDD cell which is the PCell.

Alternatively, if the UE which simultaneously supports the TDD cell and the FDD cell intends to transmit the PRACH to the FDD cell, the FDD cell may allow the UE to use the TDD-based PRACH configuration. In this case, the FDD cell must also have additional TDD-based PRACH configuration information in addition to the existing FDD-based PRACH configuration. Further, in this case, the UE may receive the additional TDD-based PRACH configuration from the TDD cell or the PCell. A method of delivering the additional TDD-based PRACH configuration to the UE may be as follows. First, there may be a method in which the FDD-based PRACH configuration and the TDD-based PRACH configuration are both delivered to the UE. Second, it may be considered that the TDD-based PRACH configuration is delivered to the UE through RRC.

The aforementioned method has an advantage in that an opportunity in which a plurality of UEs can successfully transmit a PRACH to a corresponding FDD cell is increased. For example, a plurality of PRACH resources can be allocated to the same subframe by considering a TDD configuration in the FDD cell. There is another advantage in that, when the UE intends to perform a random access process with respect to the FDD cell in a situation where the UE has already been communicating with a TDD cell, a timing of HARQ transmission regarding the random access process (e.g., a timing of PHICH resource allocation and transmission for Msg3) can be adjusted to the TDD cell. In this case, the PHICH transmission timing may be determined on the basis of a UL-reference configuration generated with reference to a UL-DL configuration of the TDD cell and the FDD cell.

Meanwhile, according to the aforementioned method, a collision may occur between a PRACH resource corresponding to a PRACH configuration of the TDD cell and a PRACH resource corresponding to a PRACH configuration of the FDD cell. A solution for this is provided as follows. i) As a first solution, the UE assigns a high priority to the PRACH resource of the FDD cell. Therefore, when the PRACH resource of the TDD cell and the PRACH resource of the FDD cell overlap in the same subframe (and some RBs), the PRACH resource of the TDD cell is not used. An instruction for assigning the high priority to the PRACH resource of the FDD cell may be delivered to the UE through a high layer signal. ii) As a second solution, the UE assigns a high priority to the PRACH resource of the TDD cell. Therefore, when the PRACH resource of the TDD cell and the PRACH resource of the FDD cell overlap in the same subframe (and some RBs), the PRACH resource of the FDD cell is not used. An instruction for this may be delivered to the UE through a high layer signal. iii) As a third solution, a PRACH subframe in which the UE is capable of simultaneously accessing the TDD cell and the FDD is predetermined. In this case, a priority of the PRACH resource (e.g., the TDD PRACH resource) for the UE is set to be high during a corresponding subframe duration, and a priority of the conventional FDD PRACH resource is set to be high in the remaining subframe durations. iv) As a fourth solution, when the FDD cell uses a TDD UL-DL configuration, if the UE uses a non-contention based PRACH on the basis of the FDD cell, a scheduler of the FDD cell may be allowed to perform scheduling by avoiding a resource collision. Therefore, when the UE performs the PRACH transmission according to the TDD UL-DL configuration, non-contention based PRACH transmission is achieved. In this case, when contention-based PRACH transmission is necessary, an FDD PRACH resource may be used. v) As a fifth solution, whether to use the PRACH resource of the FDD cell or the TDD PRACH configuration based on the TDD configuration may be signalled by the FDD cell to the UE. In this case, the TDD PRACH configuration may correspond to the TDD cell to which the UE has access or may correspond to a totally different TDD PRACH configuration.

Meanwhile, the aforementioned methods regarding the PRACH configuration for the FDD cell may be combined with each other. For example, a specific solution may be used when the UE accesses the FDD cell in an initial access or when the FDD cell operates as a primary cell of a carrier aggregation, and another solution may be used when the FDD cell operates as a secondary cell of the carrier aggregation.

Hereinafter, an HARQ transmission timing will be described when the UE simultaneously accesses the TDD cell and the FDD cell.

<HARQ-ACK/NACK Transmission>

As described above, the UE which has simultaneously access to the TDD cell and the FDD cell is capable of alternately using a DL carrier and UL carrier of the FDD cell in a time division manner, and in this case, a TDD UL-DL configuration may be referred to. However, in this case, a problem may occur when the UE determines an HARQ-ACK/NACK transmission timing for a PDSCH and the number of bits thereof. To solve this problem, one disclosure of the present specification allows that the HARQ-ACK/NACK transmission timing for the PDSCH and the number of bits thereof are determined by using a reference configuration proposed for a case where a carrier aggregation (CA) is achieved conventionally on cells using different TDD UL-DL configurations.

Table 4 below shows a DL reference configuration according to a UL-DL configuration combination when the CA is achieved on cells using the different TDD UL-DL configurations in LTE-A. In the table below, a primary cell may be a TDD cell to which the UE has access, and a secondary cell may be an FDD cell to which the UE has access.

TABLE 4

| Set | (UL-DL configuration of primary cell, UL-DL configuration of secondary cell) | DL reference UL-DL configuration |
|---|---|---|
| Set 1 | (0, 0) | 0 |
|  | (1, 0), (1, 1), (1, 6) | 1 |
|  | (2, 0), (2, 2), (2, 1), (2, 6) | 2 |
|  | (3, 0), (3, 3), (3, 6) | 3 |
|  | (4, 0), (4, 1), (4, 3), (4, 4), (4, 6) | 4 |
|  | (5, 0), (5, 1), (5, 2), (5, 3), (5, 4), (5, 5), (5, 6) | 5 |
|  | (6, 0), (6, 6) | 6 |
| Set 2 | (0, 1), (6, 1) | 1 |
|  | (0, 2), (1, 2), (6, 2) | 2 |
|  | (0, 3), (6, 3) | 3 |
|  | (0, 4), (1, 4), (3, 4), (6, 4) | 4 |
|  | (0, 5), (1, 5), (2, 5), (3, 5), (4, 5), (6, 5) | 5 |
|  | (0, 6) | 6 |
| Set 3 | (3, 1), (1, 3) | 4 |
|  | (3, 2), (4, 2), (2, 3), (2, 4) | 5 |
| Set 4 | (0, 1), (0, 2), (0, 3), (0, 4), (0, 5), (0, 6) | 0 |
|  | (1, 2), (1, 4), (1, 5) | 1 |
|  | (2, 5) | 2 |
|  | (3, 4), (3, 5) | 3 |
|  | (4, 5) | 4 |
|  | (6, 1), (6, 2), (6, 3), (6, 4), (6, 5) | 6 |
| Set 5 | (1, 3) | 1 |
|  | (2, 3), (2, 4) | 2 |
|  | (3, 1), (3, 2) | 3 |
|  | (4, 2) | 4 |

Figure 14:
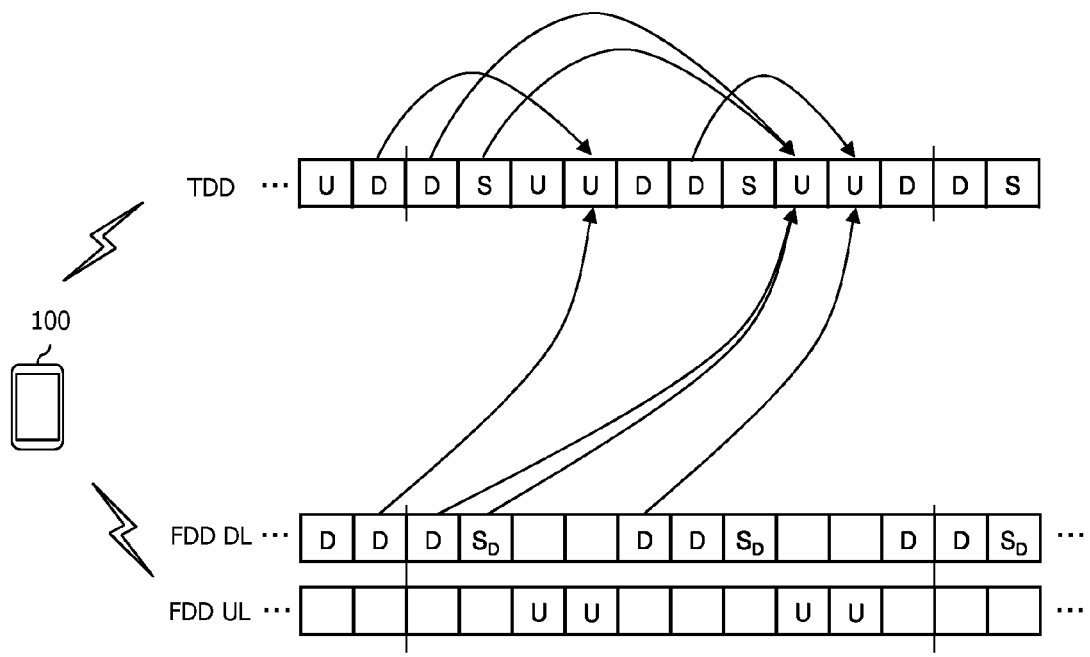
FIG. 14 shows an example of a transmission timing of hybrid automatic repeat request (HARQ)-acknowledgement (ACK)/non-acknowledgement (NACK).

FIG. 14 shows an example of a transmission timing of HARQ-ACK/NACK.

Referring to FIG. 14, in a situation where a primary cell is a TDD cell and a secondary cell is an FDD cell in a carrier aggregation of a UE 100, an HARQ-ACK/NACK timing for a PDSCH is exemplified in an example in which the FDD cell operates a UL subframe and a DL subframe by using the same configuration as a UL-DL configuration of the TDD cell. In addition, in the example of FIG. 14, it is shown that the UE 100 can transmit a PUSCH not only to the TDD cell but also to the FDD cell. In this case, as illustrated, the UE 100 can transmit HARQ-ACK/NACK for a PDSCH received from the FDD cell which is the secondary cell to the TDD cell which is the primary cell.

On the other hand, if each cell intends to transmit the HARQ-ACK/NACK for the PUSCH transmitted by the UE 100, as described above, a reference configuration of LTE-A for a case where a CA is achieved on cells using different TDD UL-DL configurations may be used to determine the HARQ-ACK/NACK transmission timing for the PUSCH.

Table 5 below shows a UL reference configuration according to a UL-DL configuration combination when a CA is achieved on cells using different TDD UL-DL configurations in LTE-A.

TABLE 5

| Set | (UL-DL configuration of another cell, UL-DL configuration of serving cell) | UL reference UL-DL configuration |
|---|---|---|
| Set 1 | (1, 1), (1, 2), (1, 4), (1, 5) | 1 |
|  | (2, 2), (2, 5) | 2 |
|  | (3, 3), (3, 4), (3, 5) | 3 |
|  | (4, 4), (4, 5) | 4 |
|  | (5, 5) | 5 |
| Set 2 | (1, 0), (2, 0), (3, 0), (4, 0), (5, 0) | 0 |
|  | (2, 1), (4, 1), (5, 1) | 1 |
|  | (5, 2) | 2 |
|  | (4, 3), (5, 3) | 3 |
|  | (5, 4) | 4 |
|  | (1, 6), (2, 6), (3, 6), (4, 6), (5, 6) | 6 |
| Set 3 | (3,) | 1 |
|  | (3, 2), (4, 2) | 2 |
|  | (1, 3), (2, 3) | 3 |
|  | (2, 4) | 4 |
| Set 4 | (0, 0), (6, 0) | 0 |
|  | (0, 1), (0, 2), (0, 4), (0, 5), (6, 1), (6, 2), (6, 5) | 1 |
|  | (0, 3), (6, 3) | 3 |
|  | (6, 4) | 4 |
|  | (0, 6), (6, 6) | 6 |

Meanwhile, although whether an FDD cell is a primary cell or a secondary cell is not distinguished in an access method in which a TDD UL-DL configuration is applied to the FDD cell, it can be said that an effect thereof is significant when the FDD cell is the secondary cell.

On the other hand, when the FDD cell is operated with the UL subframe and the DL subframe unlike in the TDD UL-DL configuration of Table 1, there is a need to newly define an HARQ-ACK/NACK transmission timing for this. For example, when the FDD cell is operated with the UL subframe at a position of the DL subframe of the TDD cell and the FDD cell is operated with the DL subframe at a position of the UL subframe of the TDD cell, there is a need to newly define the HARQ-ACK/NACK transmission timing. A UL-DL configuration which can be operated by the FDD cell is shown below according to the TDD UL-DL configuration of the TDD cell.

TABLE 6

| UL-DL configuration of TDD cell | UL-DL configuration operable in FDD cell |
|---|---|
| 0 | U X D D D U X D D D |
| 1 | U X D D U U X D D U |
| 2 | U X D U U U X D U U |
| 3 | U X D D D U U U U U |
| 4 | U X D D U U U U U U |
| 5 | U X D U U U U U U U |
| 6 | U X D D D U X D D U |

In the table above, U denotes a UL subframe, D denotes a DL subframe, and X denotes a dynamic subframe. The dynamic subframe indicated by X may be dynamically operable as the DL subframe or the UL subframe for each UE or for each group of UEs. In case of the UL-DL configurations 3, 4, and 5 in the table above, the subframe indicated by X may be operable as the UL subframe.

In this case, regarding the PDSCH HARQ-ACK timing, the same timing as in the conventional FDD (i.e., HARQ-ACK/NACK for a PDSCH received in a subframe n is transmitted on a subframe n+4) may be applied. However, optionally, UCI may be transmitted also in a cell configured as a secondary cell. The UCI may be transmitted through a PUSCH or a PUCCH or other physical channels. This will be described with reference to FIG. 15.

Figure 15:
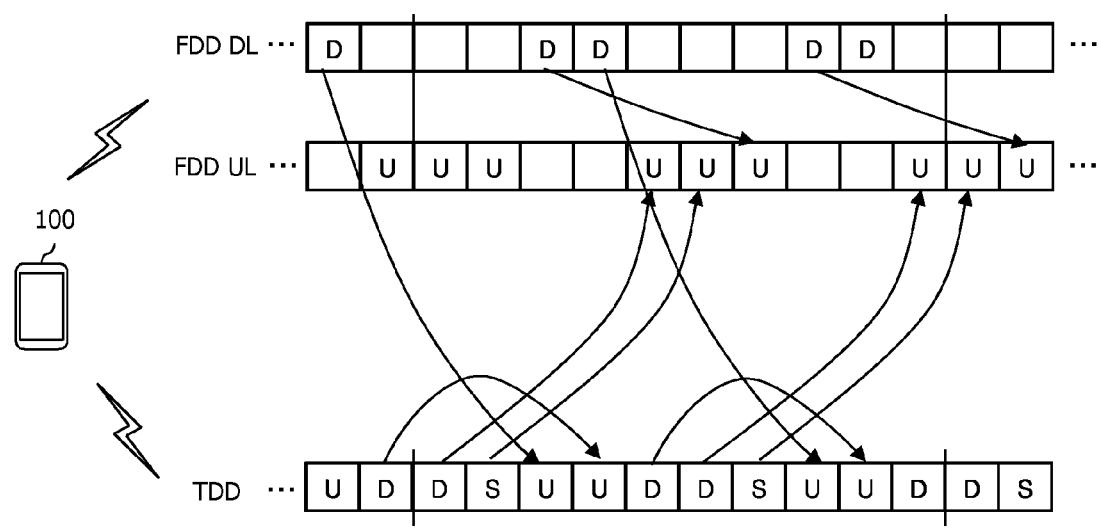
FIG. 15 shows another example of a transmission timing of HARQ-ACK/NACK.

FIG. 15 shows another example of a transmission timing of HARQ-ACK/NACK.

Referring to FIG. 15, in a situation where a primary cell is a TDD cell and a secondary cell is an FDD cell in a carrier aggregation of a UE 100, an HARQ-ACK/NACK timing for a PDSCH is exemplified in an example in which the FDD cell operates a UL subframe and a DL subframe by using a configuration opposite to a UL-DL configuration of the TDD cell. For example, if the UL-DL configuration of the TDD cell is 2 and a PDSCH of a subframe 0 of the TDD cell is transmitted, HARQ-ACK for the PDSCH may be transmitted through a PUSCH or a PUCCH on a subframe 4 of the FDD cell.

The above description may also be applied equally when determining a PUSCH HARQ-ACK timing (i.e., a PHICH timing). In this case, the maximum number of HARQ processes may be 8 if the UE is capable of simultaneously accessing the FDD cell and the TDD cell. In this case, the number of bits for indicating an HARQ process in a DCI format may be decreased to 3 in comparison with the conventional method. In addition, a TDD-related item, such as a UL index, DAI value, SRS request field, or the like may be omitted in the DCI format. The aforementioned omission or decrease in the number of bits may also be applied to a case where the FDD cell performs scheduling for the TDD cell, that is, when cross scheduling is used.

Although the aforementioned description is for a case where the UE simultaneously accesses the TDD cell and the FDD cell, it may also be applied to a case where the UE simultaneously accesses two or more FDD cells. For example, the UE may perform DL reception from one FDD cell while performing UL transmission to another FDD cell. On the contrary, the UE may perform UL transmission to one FDD cell while performing DL reception to another cell. This method may be effective in a sense that an HARQ-ACK/NACK timing can be maintained while minimizing a scheduling restriction for the UE having access to each FDD cell in a half-duplex communication manner. In addition, a UE which cannot simultaneously perform UL transmission and DL reception may be allowed to perform DL reception at a specific time point from two FDD cells and to perform UL transmission at different time points. For this, the UE must be time synchronized to both of the two cells. However, if the time synchronization is not matched between the two cells, for example, if a time synchronization is different by one subframe between the two cells, when an FDD cell which is temporally advanced operates a subframe 1 in DL, an FDD cell which is temporally behind may operate a subframe 2 in DL. For this, the two FDD cells may share information of operating the subframe with each other.

On the other hand, a channel state information-reference signal (CSI-RS) will be described hereinafter.

<CSI Reference Configuration Method>

In general, a CSI-RS is used as a basis of measuring channel state information (CSI), for example, a channel quality indicator (CQI) or the like, and may be configured differently according to a transmission mode (TM), a CSI transmission type (e.g., periodic CSI transmission or aperiodic CSI transmission), a relation with a random access grant, the number of CSI processes, a cell type (e.g., a TDD cell, an FDD cell), or the like.

However, if a UE has access to the TDD cell and the FDD cell through a carrier aggregation (CA) or a dual connectivity, a resource for the CSI-RS may not be appropriate to measure the CQI or the like according to a situation in which transmission/reception is performed with respect to the two cells. In particular, when a half-duplex scheme is used and the TDD cell is configured as a primary cell or when a PUCCH is transmitted only to the TDD cell, even if the TDD cell may operate a specific subframe as a UL subframe and the FDD cell operates a subframe at the same position as the specific subframe as a DL subframe, a resource for the CSI-RS may not be utilized in the measurement on the DL subframe. Therefore, in a situation where the UE accesses to the TDD cell and the FDD cell through the carrier aggregation or through the dual connectivity, if the TDD cell configures the specific subframe as the DL subframe, the DL subframe may be valid. However, if the TDD cell configures the specific subframe as a special subframe, the subframe may be valid only when a length of DwPts of the special subframe is greater than 7680 $T_s$.

Figure 16:
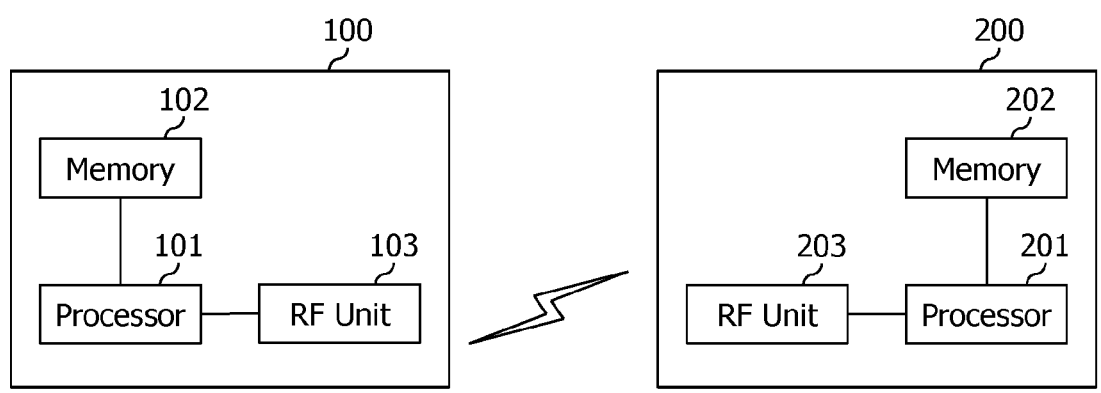
FIG. 16 is a block diagram of a wireless communication system according to a disclosure of the present specification.

The aforementioned embodiments of the present invention can be implemented through various means. For example, the embodiments of the present invention can be implemented in hardware, firmware, software, combination of them, etc. Details thereof will be described with reference to the drawing FIG. 16 is a block diagram of a wireless communication system according to a disclosure of the present specification.

A BS 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the BS may be implemented by the processor 201.

A UE 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method by which a user equipment (UE) simultaneously accesses a plurality of cells, the method comprising:
 establishing a connection with a frequency division duplex (FDD)-based first cell and a time division duplex (TDD)-based second cell;
 transmitting and receiving a control signal and data with respect to the FDD-based first cell and the TDD-based second cell; and
 transmitting a physical random access channel (PRACH) according to a configuration of a cell corresponding to a primary cell of a carrier aggregation (CA) between the FDD-based first cell and the TDD-based second cell,
 wherein an uplink (UL) subframe and downlink (DL) subframe of the FDD-based first cell is provided to the UE in a time division manner on the basis of TDD.

2. The method of claim 1, wherein the UL subframe and DL subframe provided to the UE from the FDD-based first cell are determined on the basis of a TDD UL-DL configuration of the TDD-based second cell.

3. The method of claim 2, wherein the UL subframe and DL subframe of the FDD-based first cell have the same arrangement as an arrangement of a subframe based on the TDD UL-DL configuration of the TDD-based second cell.

4. The method of claim 2, wherein the UL subframe and DL subframe of the FDD-based first cell have an arrangement opposite to an arrangement of a subframe based on the TDD-based second TDD UL-DL configuration.

5. The method of claim 2, wherein the UL subframe or the DL subframe is located by the FDD-based first cell on a position of a specific subframe based on the TDD-based second cell.

6. The method of claim 1, further comprising:
 receiving a TDD-based PRACH configuration for the FDD-based first cell.

7. A user equipment (UE) capable of simultaneously accessing a plurality of cells, the UE comprising:
 a transceiver; and
 a processor configured to:
  establish a connection with a frequency division duplex (FDD)-based first cell and a time division duplex (TDD)-based second cell and thereafter for transmitting/receiving a control signal and data, and
  transmit a physical random access channel (PRACH) via the transceiver according to a configuration of a cell corresponding to a primary cell of a carrier aggregation (CA) between the FDD-based first cell and the TDD-based second cell,
 wherein an uplink (UL) subframe and downlink (DL) subframe of the FDD-based first cell is provided to the UE in a time division manner on the basis of TDD.

8. The UE of claim 7, wherein the UL subframe and DL subframe provided to the UE from the FDD-based first cell are determined on the basis of a TDD UL-DL configuration of the TDD-based second cell.

9. The UE of claim 8, wherein the UL subframe and DL subframe of the FDD-based first cell have the same arrangement as an arrangement of a subframe based on the TDD UL-DL configuration of the TDD-based second cell.

10. The UE of claim 8, wherein the UL subframe and DL subframe of the FDD-based first cell have an arrangement opposite to an arrangement of a subframe based on the TDD-based second TDD UL-DL configuration.

11. The UE of claim 8, wherein the UL subframe or the DL subframe is located by the FDD-based first cell on a position of a specific subframe based on the TDD-based second cell.

12. The UE of claim 7, wherein the processor is further configured to:
   receive a TDD-based PRACH configuration for the FDD-based first cell via the transceiver.

\* \* \* \* \*